United States Patent
Douyere

(10) Patent No.: US 11,115,251 B1
(45) Date of Patent: Sep. 7, 2021

(54) PAM4 EQUALIZATION DSM

(71) Applicant: Litrinium, Inc., Aliso Viejo, CA (US)

(72) Inventor: Sebastien Douyere, Roquefort les pins (FR)

(73) Assignee: Litrinium, Inc., Mission Viejo, CA (US)

(*) Notice: Subject to any disclaimer, the term of this patent is extended or adjusted under 35 U.S.C. 154(b) by 0 days.

(21) Appl. No.: 17/156,346

(22) Filed: Jan. 22, 2021

(51) Int. Cl.
*H04L 25/49* (2006.01)
*H04L 27/01* (2006.01)

(52) U.S. Cl.
CPC .......... *H04L 25/4917* (2013.01); *H04L 27/01* (2013.01)

(58) Field of Classification Search
CPC ................. H04L 25/4917; H04L 25/03; H04L 25/03006; H04L 25/03012; H04L 25/03019; H04L 25/035057; H04L 25/03063; H04L 25/0307; H04L 25/03082–03108; H04L 25/03254; H04L 25/03267; H04L 27/01
See application file for complete search history.

(56) References Cited

U.S. PATENT DOCUMENTS

| | | | | |
|---|---|---|---|---|
| 4,789,994 A * | 12/1988 | Randall | ............. | H04L 25/03057 333/18 |
| 6,968,480 B1 * | 11/2005 | Yuan | .................... | H04L 25/4923 714/700 |
| 7,058,150 B2 * | 6/2006 | Buchwald | ......... | H04L 25/03006 375/355 |
| 7,764,757 B2 * | 7/2010 | Hidaka | .................. | H04L 25/061 375/354 |
| 8,311,176 B2 * | 11/2012 | Lee | ........................ | H04L 7/0012 375/375 |
| 8,331,512 B2 * | 12/2012 | Lee | ........................ | H03L 7/0814 375/355 |
| 8,548,110 B2 * | 10/2013 | Lin | ........................ | H04L 7/0331 375/355 |
| 8,576,903 B2 * | 11/2013 | Raphaeli | ............ | H04L 25/03057 375/233 |
| 8,848,774 B2 * | 9/2014 | Zhong | ................ | H04L 25/03343 375/232 |
| 8,855,186 B2 * | 10/2014 | Tan | .................... | H04L 25/03057 375/233 |
| 8,958,504 B2 * | 2/2015 | Warke | ................. | H04L 27/0014 375/327 |
| 9,191,245 B2 * | 11/2015 | Tan | .................... | H04L 25/03057 |
| 9,300,503 B1 * | 3/2016 | Holden | ................ | H04L 25/028 |
| 9,397,824 B1 * | 7/2016 | Hoshyar | ............... | H04L 7/0331 |
| 9,455,825 B2 * | 9/2016 | Lin | .................... | H04L 25/03885 |
| 9,544,864 B1 * | 1/2017 | Takahashi | ......... | H04W 56/0015 |
| 9,553,742 B1 * | 1/2017 | Xu | ....................... | H04L 25/0384 |

(Continued)

*Primary Examiner* — James M Perez
(74) *Attorney, Agent, or Firm* — Fish IP Law, LLP

(57) ABSTRACT

In a system for calibrating PAM4 signals, an equalizer determines a first signal amplitude measurement of the PAM4 signal. The equalizer determines a first signal boost measurement of the PAM4 signal. The equalizer determines whether the first signal boost measurement and the signal amplitude measurement are substantially consistent with each other. Responsive to determining that the signal boost and the signal amplitude are not substantially consistent with each other, the equalizer determines a reference amplification modification and calibrates a PAM4 signal according to the determined reference amplification modification.

6 Claims, 10 Drawing Sheets

(56) References Cited

U.S. PATENT DOCUMENTS

| | | | |
|---|---|---|---|
| 9,559,880 B1* | 1/2017 | Cirit | H04L 25/08 |
| 9,645,965 B2* | 5/2017 | Das Sharma | H04L 25/0272 |
| 9,722,822 B1* | 8/2017 | Zhang | H04L 25/03878 |
| 9,755,870 B1* | 9/2017 | Cirit | H04L 27/02 |
| 9,800,438 B1* | 10/2017 | Zhang | H04L 7/0087 |
| 9,825,723 B2* | 11/2017 | Holden | H04L 25/0272 |
| 9,899,797 B2* | 2/2018 | Bajwa | H01S 5/0427 |
| 9,935,682 B1* | 4/2018 | Chada | H04L 25/4919 |
| 10,009,195 B2* | 6/2018 | Pham | H04L 25/03063 |
| 10,027,286 B2* | 7/2018 | Bajwa | H03F 3/45475 |
| 10,038,575 B1* | 7/2018 | Steffan | H04L 27/01 |
| 10,491,365 B1* | 11/2019 | Lin | H03L 7/0807 |
| 10,547,475 B1* | 1/2020 | Gagnon | H04L 25/03057 |
| 10,892,763 B1* | 1/2021 | Hidaka | H03L 7/0807 |
| 2004/0203559 A1* | 10/2004 | Stojanovic | H04L 25/063 455/403 |
| 2005/0134305 A1* | 6/2005 | Stojanovic | H04L 25/4917 326/31 |
| 2005/0201491 A1* | 9/2005 | Wei | H04L 27/02 375/326 |
| 2006/0188043 A1* | 8/2006 | Zerbe | H04L 25/03343 375/346 |
| 2006/0227912 A1* | 10/2006 | Leibowitz | H04L 1/242 375/350 |
| 2007/0195874 A1* | 8/2007 | Aziz | H04L 7/0062 375/233 |
| 2007/0242741 A1* | 10/2007 | Carballo | H04L 25/03063 375/233 |
| 2008/0080610 A1* | 4/2008 | Aziz | H04L 25/03057 375/233 |
| 2010/0289544 A1* | 11/2010 | Lee | H04L 7/0331 327/159 |
| 2010/0329325 A1* | 12/2010 | Mobin | H04L 25/03057 375/232 |
| 2013/0094561 A1* | 4/2013 | Raphaeli | H04L 25/03057 375/233 |
| 2013/0241622 A1* | 9/2013 | Zerbe | H03K 3/013 327/323 |
| 2013/0243070 A1* | 9/2013 | Ito | H04L 27/01 375/233 |
| 2014/0169426 A1* | 6/2014 | Aziz | H03F 3/195 375/224 |
| 2014/0169439 A1* | 6/2014 | Liu | H04L 25/03038 375/233 |
| 2014/0233619 A1* | 8/2014 | Sindalovsky | H04L 1/201 375/224 |
| 2017/0019275 A1* | 1/2017 | Norimatsu | H04L 25/03 |
| 2018/0041202 A1* | 2/2018 | Douyere | H01L 27/0255 |
| 2020/0252248 A1* | 8/2020 | Palusa | H04L 25/03878 |

* cited by examiner

From:

$$E_{PAM4} = \frac{20}{9}(A_{PAM4}Tb)^2 \quad \text{and} \quad E_{PAM4} = 4(A_{NRZ}Tb)^2$$

Then:

$$E_{PAM4} = E_{PAM4} \Leftrightarrow \frac{20}{9}(A_{PAM4}Tb)^2 = 4(A_{NRZ}Tb)^2$$

$$\Leftrightarrow \frac{20}{9}(A_{PAM4})^2 = 4(A_{NRZ})^2$$

$$\Leftrightarrow \sqrt{\frac{20}{9}}A_{PAM4} = \sqrt{4}A_{NRZ}$$

$$\Leftrightarrow \sqrt{\frac{20}{36}}A_{PAM4} = A_{NRZ}$$

*FIGURE 3*

PAM4 EQUALIZATION DSM

FIELD OF THE INVENTION

The field of the invention is signal processing.

BACKGROUND

The inventive concepts herein aim to use reference signals to compensate for any under and/or over equalization of a signal, such as a PAM4 signal.

In current systems, an upstream device (i.e., transmitter) sends data to a downstream device (i.e., receive) through one or more mediums. Typical mediums can include conventional cables and printed circuit boards. The characteristics of the medium often introduce some high frequency loss in the transmitted signal because of bandwidth limitations. The amount of the high frequency loss is dependent on the length of the medium at first order. The high frequency losses cause transmitted signal quality degradation at the receiver, which results in inter-symbol interference ("ISI"). As a result, in PAM4 and NRZ (PAM2) transmission, the transmitted voltage associated with the signal can degrade to a level at which the receive cannot determine the correct level associated of a received symbol. This inability to determine the correct logic level because of ISI results in increased transmission errors, which can often cause further downstream problems To cope with these transmission errors, many systems use programmable equalizers, which are pre-programmed to a particular high frequency compensation profile. In systems where the medium loss profile as well as the swing from the transmitter is dynamic and where the transmitter output signal can also vary with time due to temperature, supply variation and other factors, the static nature of programmable equalizers fails to adapt to the dynamic changes of the received signal, resulting in increased transmission errors.

Many solutions exist in order to automatically equalize an NRZ signal. However, conventional solutions for NRZ signals fail to enable equalization for PAM4 signals. One of the biggest challenges in PAM4 signal adaptive equalization is creating a reference signal which is correlated to the input signal.

There is a need for signal processing systems that can equalize PAM4 signals. The present invention contemplates the use of an equalization loop to automatically determine an optimum compensation point despite a dynamically changing high frequency loss profile and transmitter output swing. This equalization process is based on a reference signal generated from the received signal to be equalized. The invention described herein addresses the technical challenges presented by a changing computing landscape, which increasingly prioritizes reduced ISI.

U.S. Pat. No. 8,576,903 B2 to Raphaeli teaches a PAM-N feedback equalizer that comprises a coefficient computation unit that includes a feedback unit that uses computed feedback coefficients to mitigate interference from data symbols. Raphaeli further includes an error and decision unit for computing at least an error value with respect to one of a plurality of decision levels. Raphaeli, however, fails to contemplate to compensate for PAM4 signals in an analog domain.

Raphaeli and all other extrinsic materials discussed herein are incorporated by reference to the same extent as if each individual extrinsic material was specifically and individually indicated to be incorporated by reference. Where a definition or use of a term in an incorporated reference is inconsistent or contrary to the definition of that term provided herein, the definition of that term provided herein applies and the definition of that term in the reference does not apply.

Thus, there is still a need for processing systems that are uniquely adapted to equalize PAM4 signals.

SUMMARY OF THE INVENTION

The inventive concept herein contemplates an equalizer for modulating PAM4 signals, wherein the equalizer determines a first signal amplitude measurement of the PAM4 signal. The equalizer determines a first signal boost measurement of the PAM4 signal. The equalizer determines whether the first signal boost measurement and the signal amplitude measurement are substantially consistent with each other. Responsive to determining that the signal boost and the signal amplitude are not substantially consistent with each other, the equalizer determines a reference amplification modification and calibrates a PAM4 signal according to the determined reference amplification modification.

Various resources, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

FIG. 2 also depicts a second diagram is showing the above signal multiplied by itself in order to compute and compare the ideal PAM4 signal energy to the energy of a sliced PAM4 signal.

FIG. 3 depicts a method of determining a factor by which an amplitude must be multiplied to achieve calibration.

FIG. 4 also depicts a second diagram illustrating the cumulated energy versus the frequency of NRZ modulation and the cumulated energy versus the frequency of PAM4 modulation.

DETAILED DESCRIPTION

One should appreciate that the disclosed techniques provide many advantageous technical effects including adaptively equalizing PAM4 signals in response to dynamically changing high frequency medium loss profiles.

The following discussion provides many example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

Figure 1:
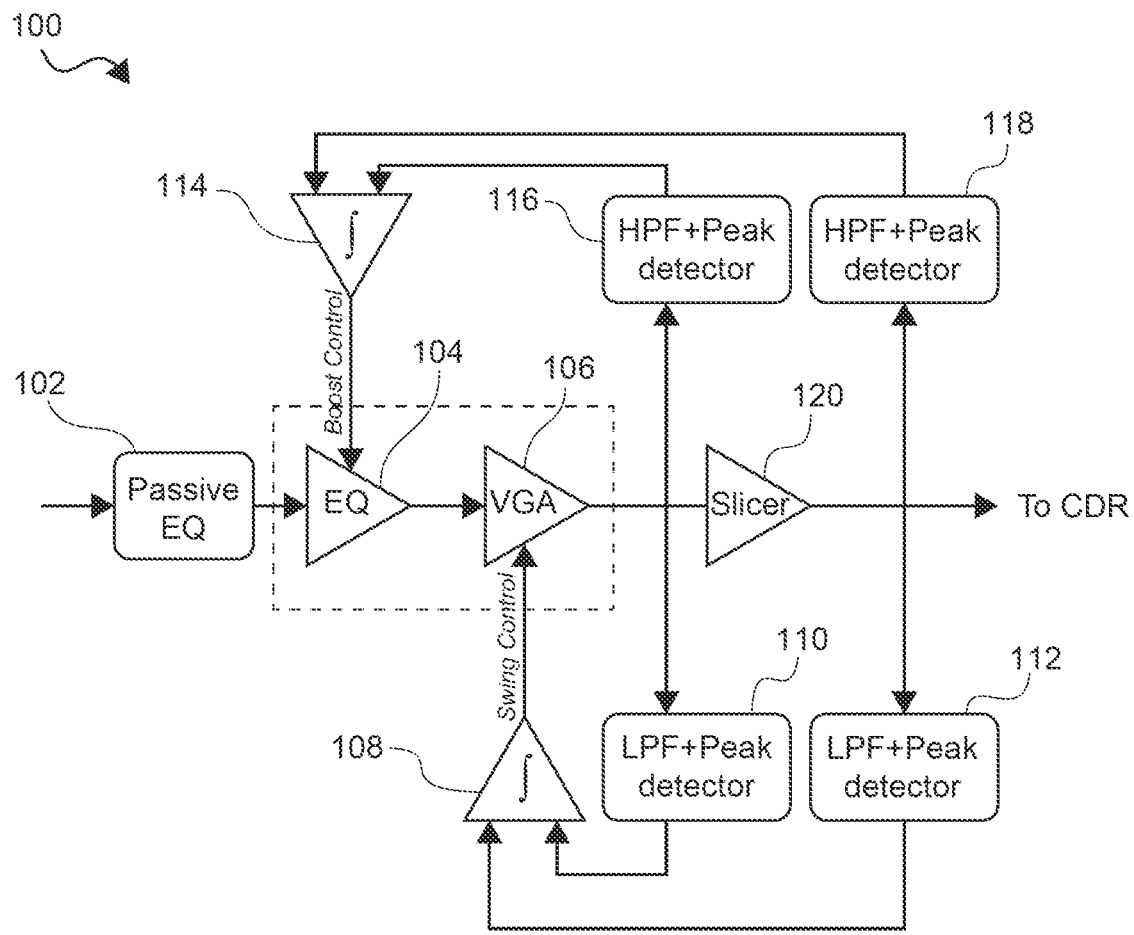
FIG. 1 is a functional block diagram illustrating a classical non-return to zero (NRZ) adaptive equalizer architecture showing how the reference signal is being generated.

FIG. 1 is a functional block diagram illustrating a non-return to zero (NRZ) architecture.

In one embodiment, equalizer 102 may include any means of manipulating an electronic signal using passive components. For example, equalizer 102 can include any mixture of resistors, capacitors, and inductors to tone an electronic signal. In another embodiment, equalizer 102 may include any means of adjusting the balance between frequency components. Equalizer 102 may be any electronic circuit placed in a receiving device. Equalizer 102 compensates for high frequency losses associated with a medium, such as the conductive mediums integrated into printed circuit boards.

Variable gain amplifier 106 varies the gain depending on a control voltage. Variable gain amplifier 106 is configured to compensate for any swing variation of an input signal from a transmitter.

Integrator 108 receives inputs from low-pass filter and peak detector 110 (LPF 110) and downstream low-pass filter and peak detector 112 (LPF 112). Integrator 108 compares a first voltage from LPF 110 and a second voltage from LPF 112. Depending on the first voltage or the second voltage is larger, integrator 108 outputs a swing control signal causing VGA 106 to vary the gain to reduce or increase the voltage swing. For example, VGA 106 can vary the gain depending on a difference between a first voltage from LPF 110 and a second voltage from LPF 112. Integrator 108, LPF 110, LPF 112, VGA 106 work cooperatively as elements associated with an amplitude control loop.

Integrator 108 can produce a linear output. In one embodiment, integrator 108 can product a linear output in an analog implementation. In another embodiment, integrator 108 can product a linear output in a digital implementation.

Integrator 114 receive inputs from high-pass filter and peak detector 116 (HPF 116) and downstream high-pass filter and peak detector 118 (HPF 118). Integrator 114 compares a first voltage from HPF 116 and a second voltage from HPF 118. Depending on the first voltage or the second voltage is larger, integrator 114 outputs a boost control signal causing equalizer 104 to correct a frequency response of a signal. Integrator 114, HPF 116, HPF 118, and equalizer 104 work cooperatively as elements associated with a boost control loop.

Slicer 120 can be a circuit that generates a reference voltage for at least one of an amplitude control loop and a boost control loop. In one embodiment, slicer 120 that is configured to provide a signal which peak to peak output amplitude and rise and fall times (i.e, high frequency energy) are independent from the boost and amplitude control loops using the slicer output signal as a reference signal for the amplitude and boost control loops. In another embodiment, slicer 120 can also be a circuit configured to provide an equalized signal to a clock data recovery circuit ("CDR"). It is contemplated that slicer 120 can include any one or more circuits used to generate a reference voltage.

Figure 2:
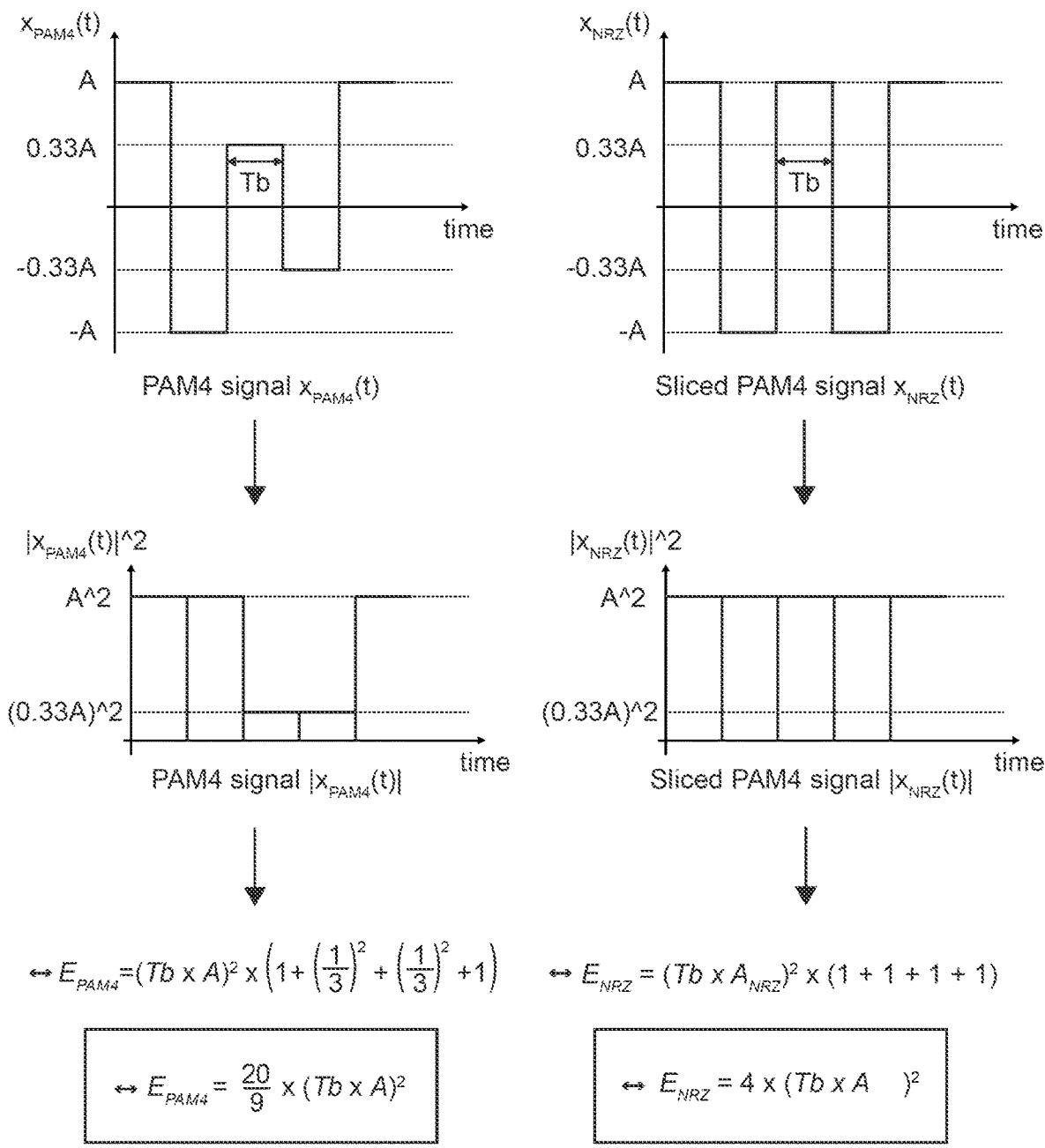
FIG. 2 depicts a first diagram illustrating an ideal PAM4 signal and a corresponding ideally sliced PAM4 signal. As used herein, an ideal PAM4 signal does not have rise and fall times.

FIG. 2 depicts a first diagram illustrating an ideal PAM4 random signal and a corresponding ideally sliced PAM4 signal with the same peak to peak amplitude. FIG. 2 also depicts a second diagram illustrating an ideal PAM4 modulated signal multiplied by itself and the ideally sliced PAM4 signal multiplied by itself. As depicted, resulting signals are integrated versus time to compute an original signal energy. In doing so, FIG. 2 shows that the energy ratio between the ideal PAM4 signal and the ideally sliced PAM4 signal ($E_{PAM4}/E_{NRZ}$) is constant and lower than a value of 1.

FIG. 3 depicts a method of determining a factor by which an amplitude must be multiplied to achieve calibration. When the ideally sliced PAM4 signal is less than the value of 1, the PAM4 signal carries less energy than a sliced version of the ideally sliced PAM4 signal. From this relation, FIG. 2 depicts $E_{PAM4}/E_{NRZ}$ as equal to the value of 1. As such, the amplitude of the NRZ signal depicted in FIG. 2 needs to be amplified by a factor of $\sqrt{20/36}$ which is approximatively 0.745×. As such, the presently claimed invention can thereby create a reference voltage from a PAM4 input signal by slicing the received PAM4 signal to a value of 0 and calibrating the amplitude of the sliced signal to approximately 0.745 times the amplitude of the PAM4 signal.

Figure 4:
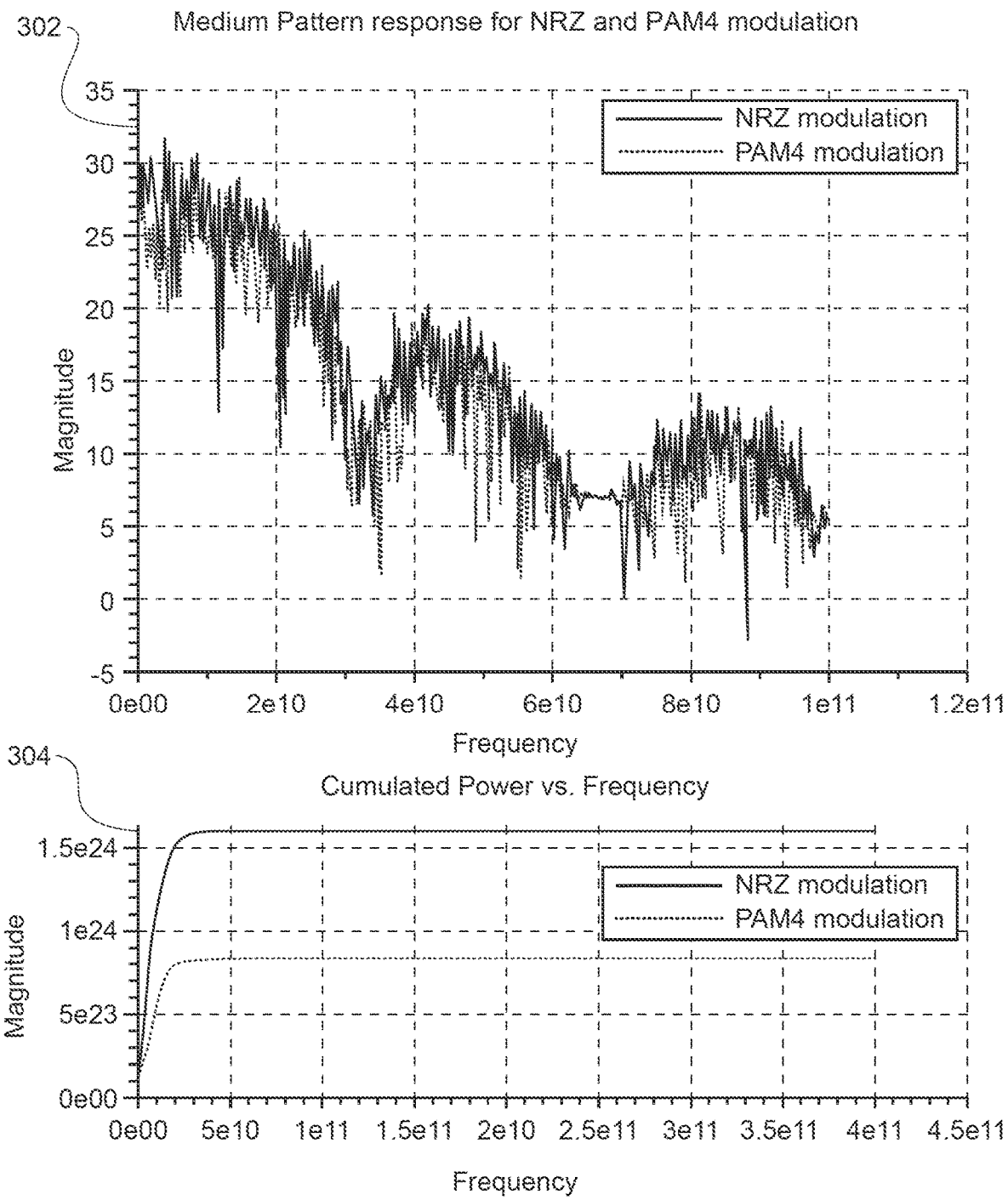
FIG. 4 depicts a first medium pattern response for a first NRZ modulation and a first PAM4 modulation with the same peak-to-peak amplitude.

FIG. 4 depicts a first medium pattern frequency response spectrum for a first PAM4 random modulation and a first sliced version of the PAM4 randomly modulated signal with the same peak-to-peak amplitude. As used herein, the first sliced version of the PAM4 modulated signal is associated with "NRZ modulation" because the first sliced version of the PAM4 modulated signal has two levels. FIG. 4 also depicts a second diagram illustrating the cumulated energy versus frequency of PAM4 modulation and the cumulated energy versus frequency of NRZ modulation. FIG. 4 depicts that a ratio of the cumulated energy of a PAM4 signal with a sliced version of the PAM4 signal is constant with frequency.

Figure 5:
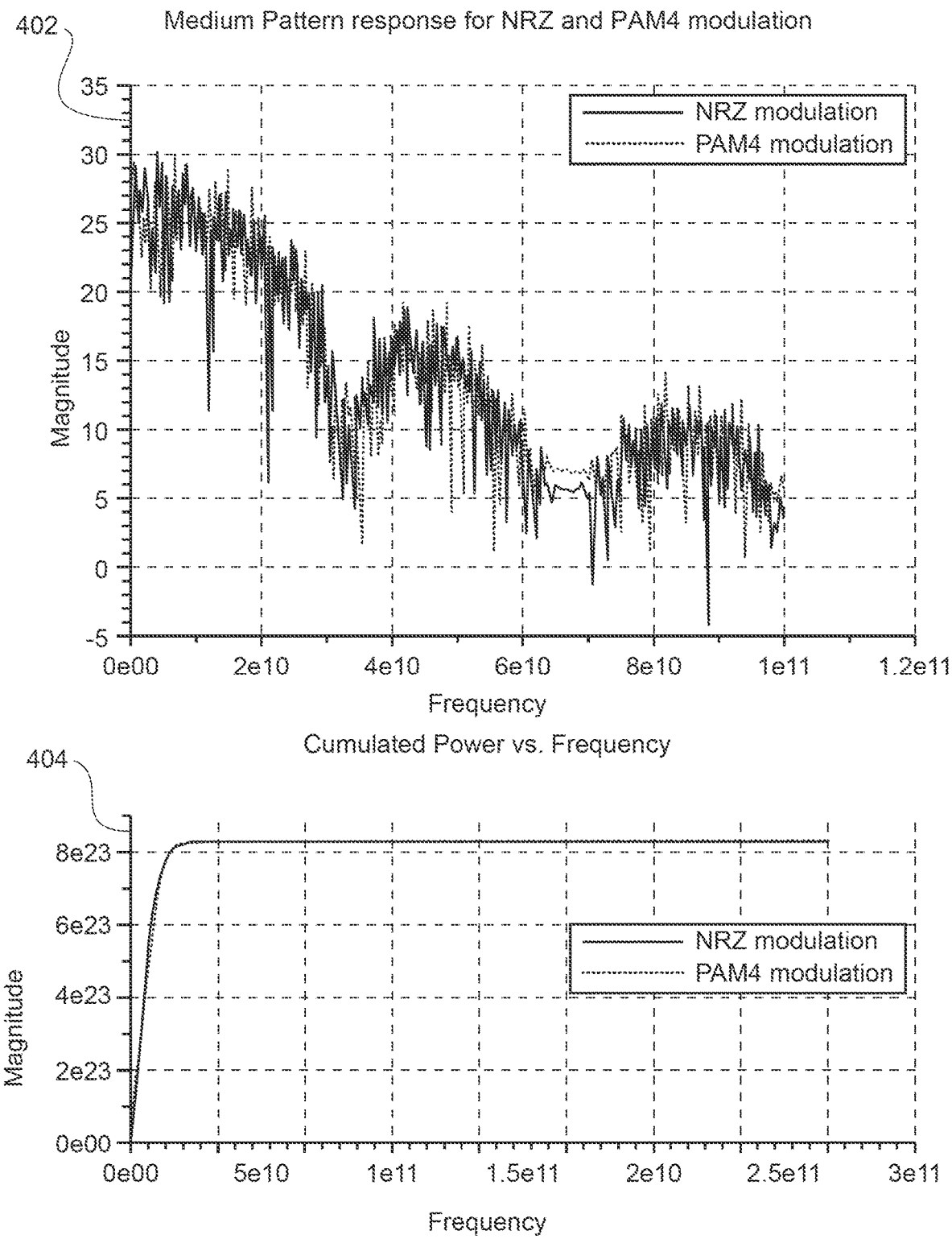
FIG. 5 depicts a first medium pattern response for a second NRZ modulation for which the amplitude has been calibrated and a second PAM4 modulation with the same amplitude as for FIG. 4 FIG. 5 also depicts a second diagram illustrating the cumulated energy versus frequency of the calibrated NRZ modulated signal, and the cumulated energy versus frequency of the PAM signal.

FIG. 5 depicts a first medium pattern frequency response medium for a second PAM4 random modulation having the same amplitude as depicted in FIG. 4 and a second sliced version of the PAM4 randomly modulation having an output swing decreased by a factor of 0.745× compared to the PAM4 signal. As used herein, the second sliced version of the PAM4 modulated signal is associated with "NRZ modulation" because the second sliced version of the PAM4 modulated signal has two levels. FIG. 5 also depicts a second diagram illustrating the cumulated energy versus frequency of PAM4 modulation and the cumulated energy versus frequency of the sliced modulation. As such, FIG. 5 depicts the cumulated energy of the NRZ modulation as equal to the cumulated energy of the PAM4 modulation after applying a constant coefficient of 0.745 to the NRZ modulation signal swing. This result is substantially consistent with the depicted diagrams of FIG. 3 and FIG. 4. Thus, in order to equalize a PAM4 signal, the presently claimed invention contemplates that a reference signal resulting from the slicing of the PAM4 equalized signal and amplified by a constant amount (0.745× in the depicted embodiments herein) can be used to equalize a PAM4 signal.

Figure 6:
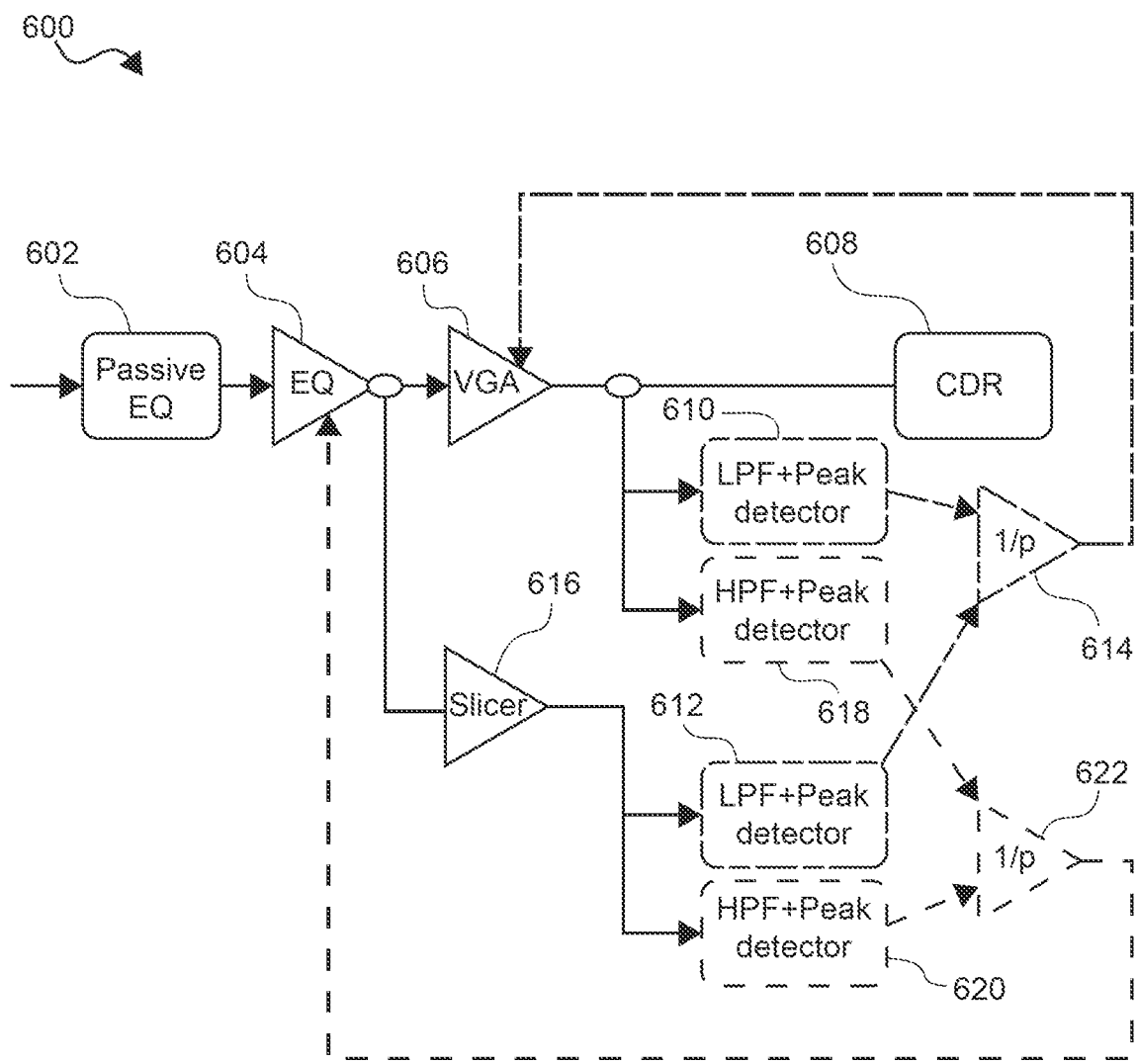
FIG. 6 is a functional block diagram illustrating a classical adaptive equalizer architecture, which includes one or more amplitude loops and one or more boost control loops.

FIG. 6 is a functional block diagram illustrating a classical NRZ automatic equalization architecture 600.

Classical NRZ automatic equalization architecture may include, but is not limited to, passive equalizer 602, equalizer 604, variable gain amplifier (VGA) 606, clock data recovery (CDR) 608, first low-pass filter and peak detector assembly 610, second low-pass filter and peak detector 612, integrator 614, slicer 616, first high-pass filter and peak detector 618, second high-pass filter and peak detector 620, and second integrator 622.

In one embodiment, equalizer 602 can include any number of passive electronic components that work individually and/or cooperatively to modify a signal. For example, equalizer 602 can include any mixture of resistors, capacitors, and inductors to tone an electronic signal.

In another embodiment, equalizer 602 can include any number of active and passive electronic components that work individually and/or cooperatively to modify a signal using feedback equalization. For example, equalizer 602 may be any electronic circuit placed in a receiving device. Equalizer 602 compensates for high frequency losses associated with a medium, such as the conductive mediums integrated into printed circuit boards.

Variable gain amplifier (VGA) 606 can be any electronic amplifier that varies its gain based on a reference voltage.

Clock data recovery (CDR) 608 can include any one or more components that sample an incoming signal with a phase aligned reference clock to generate a bit stream. CDR 608 is configured to recover data with a bit error rate (BER) under a maximum threshold. The maximum threshold of the BER can be determined and implemented in any manner known in the art.

First low-pass filter and peak detector assembly 610 (hereinafter "LPF 610") can comprise any one or more active and/or passive components that shape the frequency response of a signal. For example, LPF 610 can include any one or more components associated with an active LPF, a first order LPF, an active LPF with amplification.

Second low-pass filter and peak detector assembly 612 (hereinafter "LPF 612") can comprise any one or more active and/or passive components that shape the frequency response of a signal. For example, LPF 612 can include any one or more components associated with an active LPF, a first order LPF, an active LPF with amplification. Integrator 614 can include any one or more electronic components configured to integrate a signal either in the analog or in digital domain. Slicer 616 can include any one or more electronic components configured to slice a signal into one or more slicing levels.

First high-pass filter and peak detector assembly 618 (hereinafter "HPF 618") can include any one or more components that allow signal above frequency threshold to pass through to an output signal. Second high-pass filter and peak detector assembly 620 can include any one or more components that allow signal above frequency threshold to pass through to an output signal. Second integrator 622 can include any one or more electronic components configured to amplify a signal.

Figure 7A:
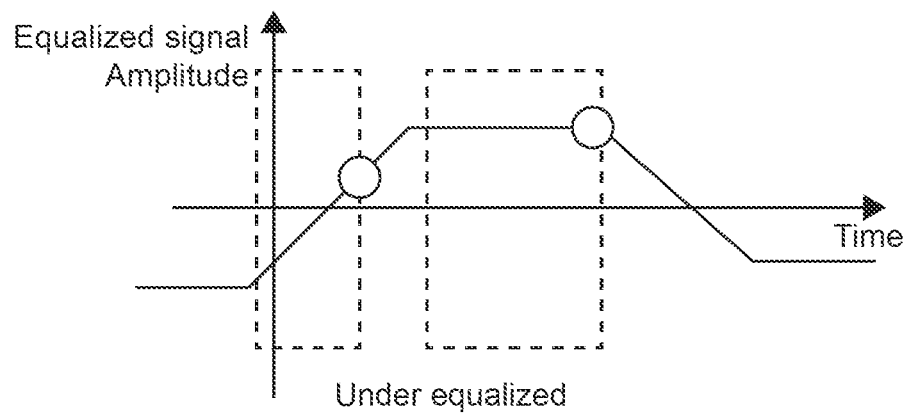
FIGS. 7A, 7B, and 7C depict signal patterns that depict an underequalized signal, an equalized signal, and an overequalized signal, respectively.

FIG. 7A depicts an under equalized signal. Underequalized signals are an undesired type of signal. Under equalized signal can cause higher intersymbol interference (ISI), which degrades a link bit error rate (BER). The increase in ISI is generated by underequalized signals as a result of a slow rise and fall time preventing the under equalized signal from reaching a designated voltage level within a bit time.

Figure 7B:
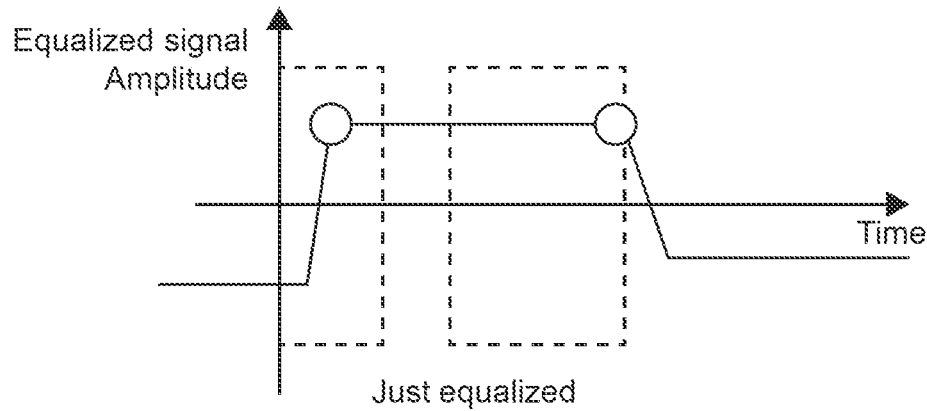

FIG. 7B depicts an equalized signal. Equalized signals are a desired type of signal.

Figure 7C:
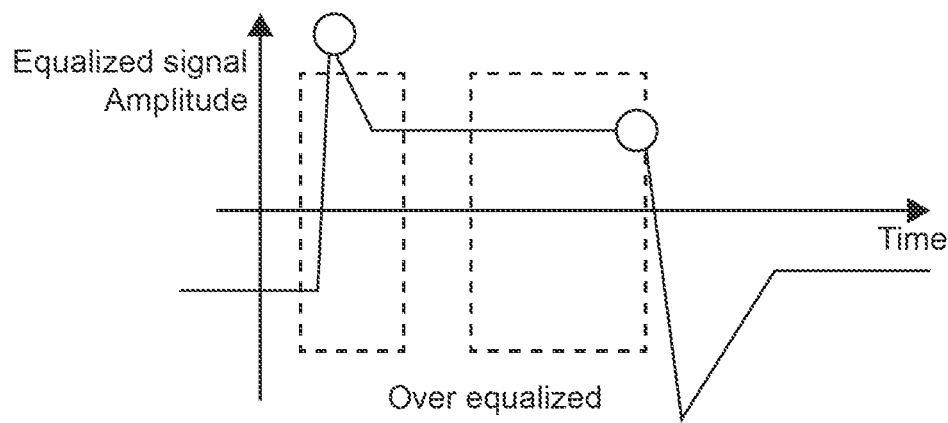

FIG. 7C depicts an over equalized signal. Over equalized signals are an undesired type of signal. Over equalized signals can cause higher intersymbol interference (ISI), which degrades a link bit error rate (BER). The increase in ISI by over equalized signals is generated by an overshoot of the over equalized signal preventing the over equalized signal from settling to a designated voltage level within a bit time.

Figure 8:
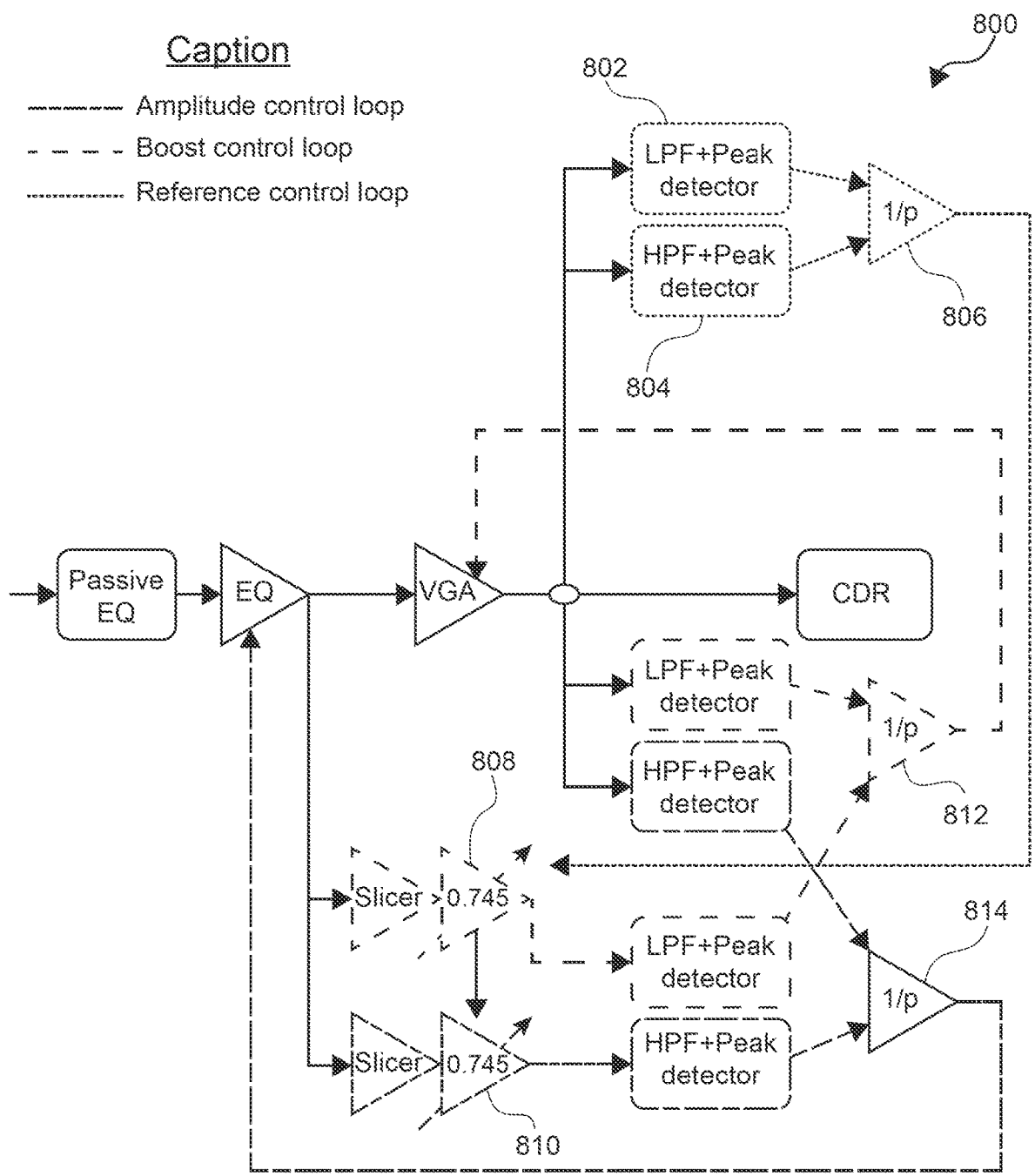
FIG. 8 is a functional block diagram illustrating a PAM4 equalizer architecture including an amplitude control loop, a boost control loop and a solution checking loop.

FIG. 8 is the functional block diagram of the PAM4 adaptive equalizer. This equalizer is based on the classical NRZ adaptive architecture 600, including an amplitude control loop and a boost control loop.

In one embodiment, the reference control loop 800 includes a low-pass filter and peak detector 802, a high-pass filter and peak detector 804, and an integrator 806. Additionally, the depicted embodiment includes a low-frequency slicer assembly 808 and a high-frequency slicer assembly 810.

Reference control loop 800 is configured to analyze a PAM4 input signal to compensate for any under equalization or over equalization. Advantageously, the reference control loop 800 can remove the need for a clock recover system and/or a frequency synthesizer system to compensate for under or over equalization. By enabling fully adaptive PAM4 equalization, the present invention allows the design of applications including many receivers by removing the steps required to program each receiver individually. For example, a board engineer would not have to manually program each receiver, thereby increasing efficiency reducing the number of steps required to program one or more receivers.

Using check loop 800, equalization DSM 800 can determine the optimum compensation point based on a medium loss profile in circumstances where the frequency loss profile as well as swing of a signal are dynamically changing.

Figure 9:
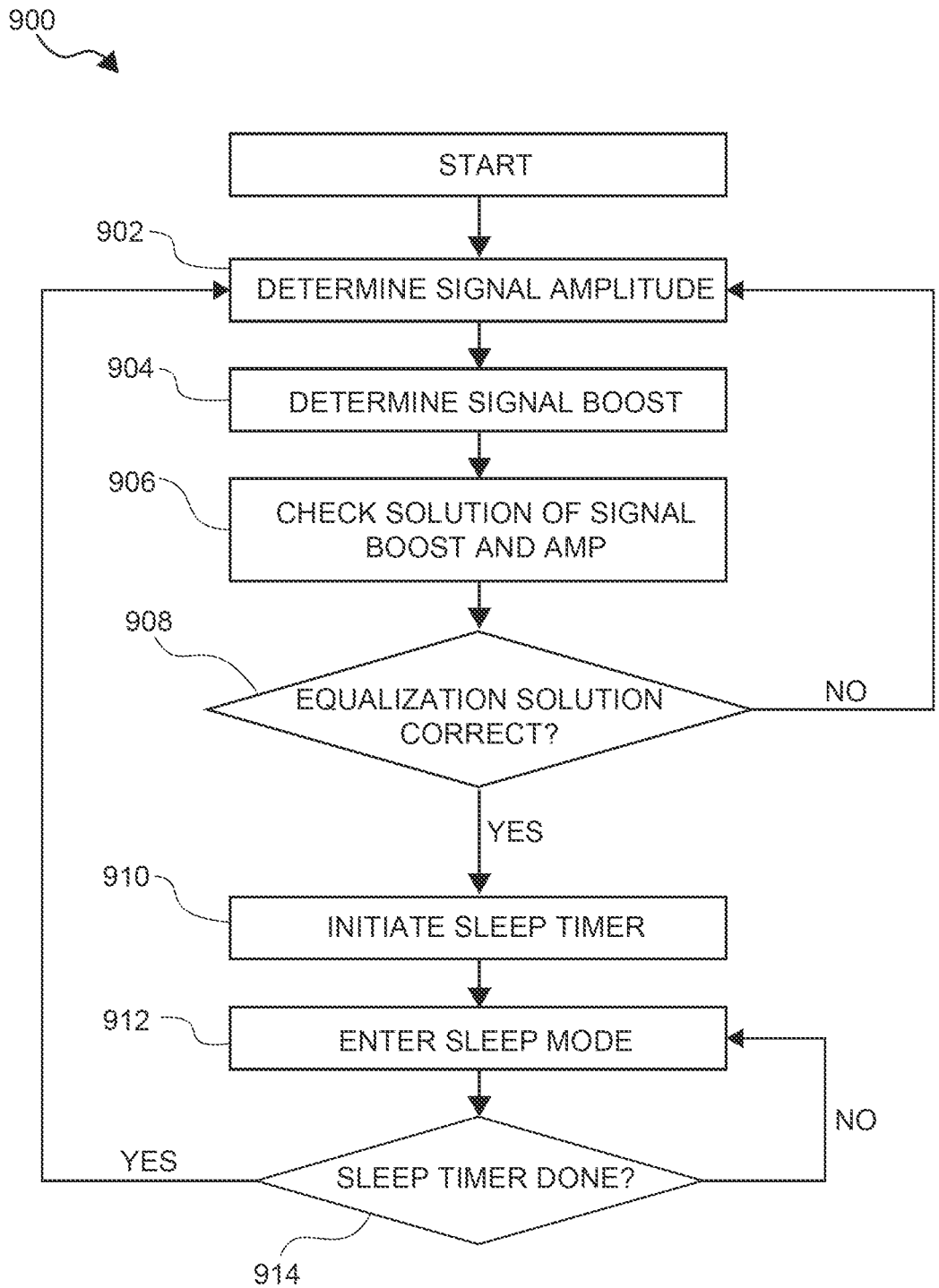
FIG. 9 is a schematic illustrating the steps in implementing a digital state machine (DSM) for automatic PAM4 input signal adaptation.

FIG. 9 is a schematic illustrating the steps in implementing a digital state machine for automatic PAM4 input signal adaptation. This state machine is controlling the integrators 806, 812, and 814 of a PAM4 equalizer.

Equalization DSM 900 determines a signal amplitude (step 902). Equalization DSM 900 can determine signal amplitude in any manner known in the art. For example, equalization DSM 110 can include any one or more sensors and software configured to measure a peak-to-peak amplitude of a signal.

Equalization DSM 900 determines a signal boost (step 904). Equalization DSM 900 can determine signal high frequency components in any manner known in the art. For example, equalization DSM 900 can include any one or more sensors and software configured to measure a high frequency energy of a signal.

Equalization DSM 900 is contemplated to determine the boost of a signal in any manner known in the art.

Equalization DSM 900 checks a solution of the signal amplitude and signal boost (806).

In one embodiment, equalization DSM 900 checks if the equalization solution found by the amplitude and boost loops is correct from a signal integrity stand point. The low frequency energy of the equalized signal is compared to the high frequency energy of the equalized signal. In doing so, the present invention detects under or over equalization issues associated with the equalized signal (see FIGS. 7A-7C). The present invention compares the amplitude and boost control loop associated with the equalized signal to the reference signal. DSM 900 compares the equalized signal to itself, thereby allowing DSM 900 to correct the reference signal amplification coefficient, if needed. As such, FIG. 5 depicts a reference control loop.

Equalization DSM 900 determines whether the equalization solution found by the amplitude and the boost control loop is correct. (decision block 908).

Responsive to determining that the signal amplitude and signal boost meet the threshold signal amplitude and signal boost ("YES" branch, decision block 908), equalization DSM 900 initiates a sleep timer for a sleep time (step 910).

Responsive to determining that the equalization solution found by the amplitude and control loops is not correct (i.e. producing some over or under equalization as shown by the figure FIG. 7.) ("NO" branch, decision block 908), equalization DSM 900 modifies the reference signal amplification coefficient and initiates a new adaptation process.

Equalization DSM 900 enters a sleep mode (step 912). The sleep mode allows a significant power saving by disabling any one or more circuits used by the amplitude, boost and reference control loops.

Equalization DSM 900 determines whether the sleep time associated with the sleep timer has fully elapsed (decision block 914)

Responsive to determining that the sleep time has fully elapsed ("YES" branch, decision block 914), reenables equalization DSM 900 and determines a second measurement of the PAM4 signal amplitude (step 902)

Responsive to determining that the sleep time has not fully elapsed ("NO" branch, decision block 914), equalization DSM 900 remains in the sleep mode (step 912)

Figure 10:
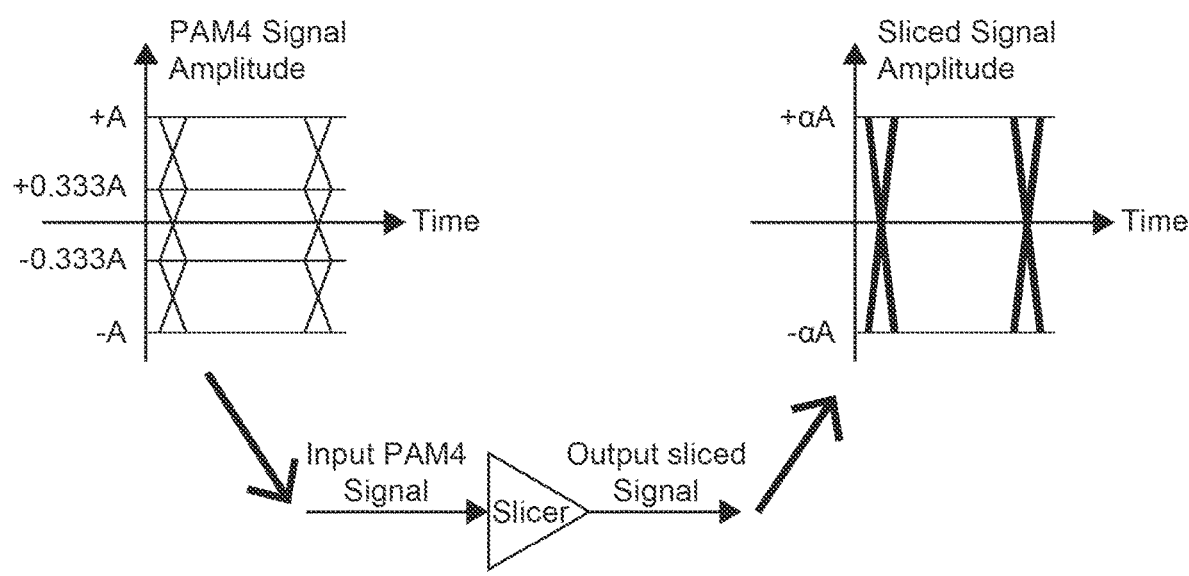
FIG. 10 is an overview figure demonstrating overarching concepts associated with slicing a PAM4 signal to reduce ISI.

FIG. 10 is an overview figure demonstrating overarching concepts associated with slicing a PAM4 signal to reduce ISI.

The flowchart and block diagrams in the Figures illustrate the architecture, functionality, and operation of possible implementations of systems and methods according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of automatically equalizing a PAM4 signal, comprising:
    generating a reference signal for the PAM4 signal by slicing the PAM4 signal into a first level and a second level;
    determining a constant coefficient;
    amplifying the reference signal by the constant coefficient, wherein the amplified reference signal is used to modulate the PAM4 signal;
    determining a first signal amplitude measurement of the PAM4 signal;
    determining a first signal boost measurement of the PAM4 signal;
    determining whether the first signal boost measurement and the signal amplitude measurement are substantially consistent with each other;
    responsive to determining that the signal boost and the signal amplitude are not substantially consistent with each other, determining a reference amplification modification; and
    calibrating a PAM4 signal according to the determined reference amplification modification.

2. The method of claim 1, further comprising;
    responsive to determining that the first signal boost measurement and the first signal amplitude measurement are substantially consistent with each other, initiating a sleep period using a sleep timer;
    determining whether the sleep period has elapsed; and
    responsive to determining that the sleep period has elapsed, determining a second signal amplitude measurement of the PAM4 signal; and
    determining a second signal boost measurement of the PAM4 signal.

3. The method of claim 1, further comprising, responsive to determining that the sleep period has not elapsed, initiating a second sleep period.

4. A system for equalizing a PAM4 signal, comprising;
    an PAM4 signal equalizer configured to:
        generate a reference signal for the PAM4 signal by slicing the PAM4 signal into a first level and a second level;
        determine a constant coefficient;
        amplify the reference signal by the constant coefficient, wherein the amplified reference signal is used to modulate the PAM4 signal;
        determine a first signal amplitude measurement of the PAM4 signal;
        determine a first signal boost measurement of the PAM4 signal;
        determine whether the first signal boost measurement and the signal amplitude measurement are substantially consistent with each other; and responsive to determining that the signal boost and the signal amplitude are not substantially consistent with each other, determine a reference amplification modification; and calibrate a PAM4 signal according to the determined reference amplification modification.

5. The system of claim 4, wherein the PAM4 signal equalizer is further configured to;

responsive to determining that the first signal boost measurement and the first signal amplitude measurement are substantially consistent with each other, initiate a sleep period using a sleep timer;

determine whether the sleep period has elapsed; and responsive to determining that the sleep period has elapsed, determine a second signal amplitude measurement of the PAM4 signal; and determine a second signal boost measurement of the PAM4 signal.

6. The system of claim 4, wherein the PAM4 signal equalizer is further configured to, responsive to determining that the sleep period has not elapsed, initiate a second sleep period.

\* \* \* \* \*